United States Patent
Nakamura

(10) Patent No.: US 11,493,424 B2
(45) Date of Patent: Nov. 8, 2022

(54) FILTER-DEGRADATION ESTIMATING DEVICE FOR VEHICULAR AIR CONDITIONER

(71) Applicant: DENSO CORPORATION, Kariya (JP)

(72) Inventor: Minoru Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 352 days.

(21) Appl. No.: 16/822,370

(22) Filed: Mar. 18, 2020

(65) Prior Publication Data
US 2020/0319075 A1    Oct. 8, 2020

(30) Foreign Application Priority Data

Apr. 3, 2019 (JP) ............... JP2019-071367

(51) Int. Cl.
| | | |
|---|---|---|
| *G01N 15/08* | (2006.01) | |
| *B01D 35/143* | (2006.01) | |
| *B60H 1/32* | (2006.01) | |
| *B60H 1/00* | (2006.01) | |

(52) U.S. Cl.
CPC ..... *G01N 15/0806* (2013.01); *B60H 1/00464* (2013.01); *B60H 1/3204* (2013.01); *G01N 2015/084* (2013.01)

(58) Field of Classification Search
CPC .... G01N 15/00; G01N 15/08; G01N 15/0806; G01N 2015/084; B01D 35/14; B01D 35/143; B01D 35/1435; B60H 1/00; B60H 1/00464; B60H 1/32; B60H 1/3204
See application file for complete search history.

(56) References Cited

U.S. PATENT DOCUMENTS

| | | | | |
|---|---|---|---|---|
| 9,046,900 B2 * | 6/2015 | Kates | ...................... | G01K 13/00 |
| 10,787,183 B2 * | 9/2020 | Ochiai | ............... | B61D 27/0018 |
| 2015/0254958 A1 * | 9/2015 | Sherman | ............ | B01D 46/0086 |
| | | | | 340/607 |

FOREIGN PATENT DOCUMENTS

| | | | | | |
|---|---|---|---|---|---|
| CN | 109595743 A | * | 4/2019 | ........... | B01D 35/143 |
| JP | 04-340197 A | | 11/1992 | | |
| JP | 09-250973 A | | 9/1997 | | |
| JP | 2020050027 A | * | 4/2020 | ............... | B60H 1/00 |
| KR | 20200025832 A | * | 3/2020 | ............... | B65H 1/00 |
| WO | WO-2006121274 A1 | * | 11/2006 | ........ | B60H 1/00064 |

* cited by examiner

*Primary Examiner* — Nguyen Q. Ha
(74) *Attorney, Agent, or Firm* — Harness, Dickey & Pierce, P.L.C.

(57) ABSTRACT

A filter monitoring system for a filter in a vehicle air conditioner includes a first temperature sensor to detect an air temperature of intake air drawn into an air conditioner case through the filter, a second temperature sensor to detect an evaporator temperature of the evaporator, and a processor coupled to the first and second temperature sensors and coupled to a memory. The processor is configured to calculate an actual change-rate of the evaporator temperature while a compressor is in operation, calculate an expected change-rate of the evaporator temperature based on the air temperature and operation levels of a blower and the compressor by using predetermined data with a properly functioning filter, calculate a degradation degree of the filter by comparing the actual change-rate to the expected change-rate, and output a signal indicating degradation of the filter upon determining that the degradation degree is out of an acceptable range.

9 Claims, 4 Drawing Sheets

NORMAL FILTER

CLOGGED FILTER

FILTER-DEGRADATION ESTIMATING DEVICE FOR VEHICULAR AIR CONDITIONER

CROSS REFERENCE TO RELATED APPLICATION

This application is based on Japanese Patent Application No. 2019-071367 filed on Apr. 3, 2019, the disclosure of which is incorporated herein by reference in its entirety.

TECHNICAL FIELD

The present disclosure relates to a filter-degradation estimating device that predicts a degradation degree of a filter to clean air drawn into an air conditioner case by a blower in a vehicular air conditioner.

BACKGROUND

A filter-clogging detecting mechanism that detects a clogging of a filter has been known. The filter is used in a forced exhausting device including a fan, and the device keeps a temperature in the device constant by rotating the fan and exhausting air in the device forcibly thorough the filter.

SUMMARY

A filter-degradation estimating device according to an aspect of the present disclosure is a device to estimate a degradation degree of a filter for cleaning air drawn into an air conditioner case by a rotation of a blower in a vehicular air conditioner.

The filter-degradation estimating device of the present disclosure includes an intake air temperature detecting section, an evaporator temperature detecting section, a temperature change rate calculating section, a standard change rate calculating section, and a degradation degree calculating section.

The intake air temperature detecting section detects a temperature of air prior to being drawn into the air conditioner case through the filter and the blower in the vehicular air conditioner.

The evaporator temperature detecting section is disposed in the air conditioner case and detects a temperature of an evaporator configured to cool the air drawn into the air conditioner through evaporation of a refrigerant.

The temperature change rate calculating section calculates a temperature change rate per unit time of the evaporator detected by the evaporator temperature detecting section when a compressor that receives and compresses the refrigerant evaporated at the evaporator is operated.

The standard change rate calculating section calculates a standard change rate based on the temperature of air detected by the intake temperature detecting section and an operation command value for the blower and the compressor.

The standard change rate is a change rate per unit time of the temperature of the evaporator when the filter is not degraded.

The standard change rate calculating section calculates the standard change rate in which the filter is not degraded based on the temperature of the air drawn into the air conditioner case, an operation state of the blower relating to the flow rate of the air, and an operation state of the compressor relating to decreasing the temperature of the evaporator.

The degradation degree calculating section calculates the degradation degree of the filter based on the change rate calculated by the temperature change rate calculating section, and the standard change rate calculated by the standard change rate calculating section.

The degradation degree calculating section calculates the degradation degree of the filter based on the temperature change rate per unit time of the evaporator calculated by the temperature change rate calculating section, and the standard change rate in the filter without degradation calculated by the standard change rate calculating section.

DETAILED DESCRIPTION

Figure 1:
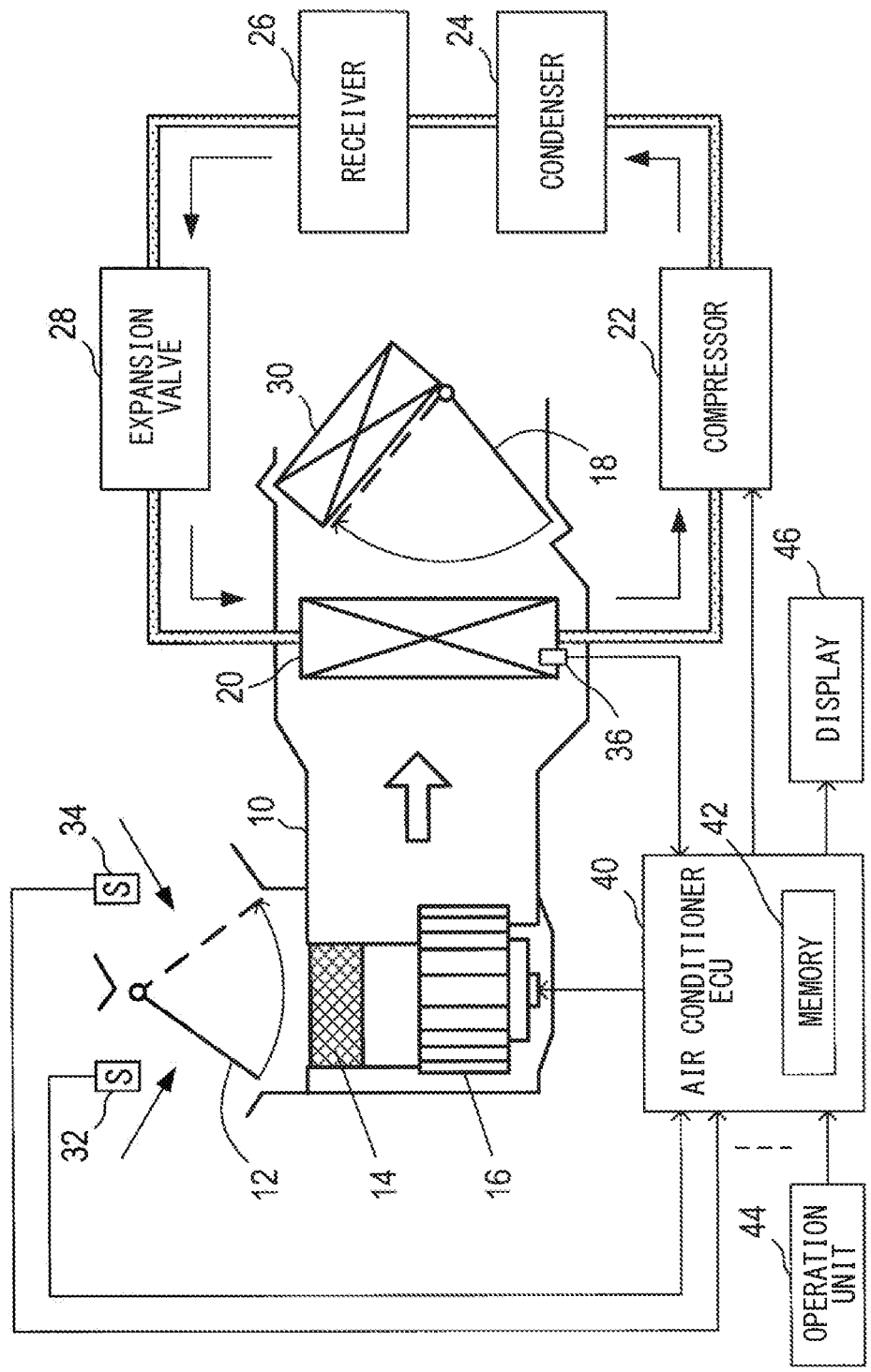
FIG. 1 is a diagram of a vehicular air conditioner.

To begin with, examples of relevant techniques will be described.

A filter-clogging detecting mechanism that detects a clogging of a filter has been known. The filter is used in a forced exhausting device including a fan, and the device keeps a temperature in the device constant by rotating the fan and exhausting air in the device forcibly thorough the filter.

The filter-clogging detecting mechanism calculates change rates of the temperature in the device in which the filter is not clogging up as changing a rotation speed of the fan, and stores the calculated change rates as a standard change rate for determination of the clogging.

In determining the clogging, the filter-clogging detecting mechanism (i) measures a change rate of the temperature in the device as changing the rotation speed of the fan like the measurement of the standard change rate, (ii) determines whether the change rate falls within an acceptable range relative to the standard change rate, and (iii) determines that the filter is clogging up upon determining the change rate is out of the acceptable range.

The above-mentioned detecting mechanism determines whether the filter is clogging up by comparing the standard change rate and the change rate of the temperature in the device measured as changing the rotation speed of the fan. Thus, the detecting mechanism can be used when the forced exhausting device is used in a room with a stable environmental temperature.

However, in a vehicular air conditioner that draws air into an air conditioner case through a filter by rotating a blower, a temperature of air drawn into the air conditioner case varies. Thus, a clogging of the filter cannot be determined accurately with using the above-mentioned techniques.

When a temperature of an intake air becomes high, cooling efficiency by rotating the blower is saturated. In this case, even if the rotation speed of the blower is changed, the temperature of the intake air does not change. Thus, the clogging of the filter cannot be determined under such condition.

The degradation degree of the filter for cleaning air needs to be estimated accurately even if a temperature of air drawn into an air conditioner case by rotating a blower in a vehicular air conditioner is changed.

A filter-degradation estimating device according to an aspect of the present disclosure is a device to estimate a degradation degree of a filter for cleaning air drawn into an air conditioner case by a rotation of a blower in a vehicular air conditioner.

The filter-degradation estimating device of the present disclosure includes an intake air temperature detecting section, an evaporator temperature detecting section, a temperature change rate calculating section, a standard change rate calculating section, and a degradation degree calculating section.

The intake air temperature detecting section detects a temperature of air drawn into the air conditioner case through the filter and the blower in the vehicular air conditioner.

The evaporator temperature detecting section is disposed in the air conditioner case and detects a temperature of an evaporator configured to cool the air drawn into the air conditioner through evaporation of a refrigerant.

The temperature change rate calculating section calculates a temperature change rate per unit time of the evaporator detected by the evaporator temperature detecting section when a compressor that receives and compresses the refrigerant evaporated at the evaporator is operated.

The standard change rate calculating section calculates a standard change rate based on the temperature of air detected by the intake temperature detecting section and an operation command value for the blower and the compressor.

The standard change rate is a change rate per unit time of the temperature of the evaporator when the filter is not degraded.

In the vehicular air conditioner, the temperature of the evaporator increases in response to the temperature and the flow rate of the air drawn into the air conditioner case by the rotation of the blower, and decreases by the operation of the compressor.

The standard change rate calculating section calculates the standard change rate in which the filter is not degraded based on the temperature of the air drawn into the air conditioner case, an operation state of the blower relating to the flow rate of the air, and an operation state of the compressor relating to decreasing the temperature of the evaporator.

The degradation degree calculating section calculates the degradation degree of the filter based on the change rate calculated by the temperature change rate calculating section, and the standard change rate calculated by the standard change rate calculating section.

If the filter is degraded (i.e., the filter is clogging up), the amount of air in the air conditioner case is reduced. In such case, the amount of heat of the intake air released in the evaporator is reduced, thus the evaporator is cooled sooner by the operation of the compressor. Accordingly, the temperature change rate per unit time of the evaporator is larger than the standard change rate. The difference or ratio between the temperature change rate and the standard change rate differs according to a degree of the clogging in the filter.

The degradation degree calculating section calculates the degradation degree of the filter based on the temperature change rate per unit time of the evaporator calculated by the temperature change rate calculating section, and the standard change rate in the filter without degradation calculated by the standard change rate calculating section.

According to the filter-degradation estimating device in the present disclosure, the degradation degree of the filter for cleaning the air drawn into the air conditioner case can be estimated accurately even if the temperature of the air varies in the vehicular air conditioner.

The standard change rate is calculated based on not only the temperature of the air drawn into the air conditioner case but also the operation command values for the blower and the compressor as parameters. Thus, the degradation degree of the filter can be estimated accurately even when the rotational state of the blower and the operation state of compressor change.

Accordingly, the filter-degradation estimating device in the present disclosure need not change the operation states of the blower and the compressor for estimating the degradation degree of the filter. Thus, the filter-degradation estimating device can prevent changes in the temperature and an amount of the conditioned air conveyed to the vehicle cabin caused by changing the operation states of the blower and the compressor.

The filter-degradation estimating device in the present disclosure can estimate the degradation degree of the filter without affecting an air conditioning control by the vehicular air conditioner.

Hereinafter, embodiments of the present disclosure will be described with reference to drawings.

An air conditioner 2 in the present embodiment is a vehicular air conditioner that is mounted in a vehicle and adjusts a temperature and a humidity of air in a vehicle cabin. The air conditioner 2 includes an air conditioner case 10 that draws air from an outside or an inside of the vehicle cabin, produces conditioned air by adjusting the temperature and the humidity, and conveys the conditioned air to the vehicle cabin.

As shown in FIG. 1, the air conditioner case 10 includes an inside/outside air switching door 12 at an inlet passage of air. The inside/outside air switching door 12 switches air drawn into the air conditioner case 10 between the outside air that is air outside the vehicle cabin and the inside air that is air in the vehicle cabin.

The air conditioner case 10 includes a filter 14 and a blower 16. The filter 14 cleans air conveyed to the vehicle cabin by removing dusts of the outside air and the inside air that are selectively drawn into the air conditioner case 10 through the inside/outside air switching door 12. The blower 16 draws the outside air and the inside air into the air conditioner case 10 through the filter 14.

The blower 16 draws the outside air and the inside air as ventilation air into the air conditioner case 10 by rotating a motor. The ventilation air drawn by the blower 16 is cooled and dehumidified in an evaporator 20, and conveyed toward the vehicle cabin.

In a passage at a downstream side of the evaporator 20 in a flow of the ventilation air, an air mix door 18 and a heater core 30 are provided. The heater core 30 heats the ventilation air with heat of an internal combustion engine mounted in the vehicle and the like. The air mix door 18 controls an amount of the ventilation air introduced to the heater core 30 after passing through the evaporator 20, and adjusts the temperature of the ventilation air mixed at a downstream side of the air mix door 18 and conveyed to the vehicle cabin.

The evaporator 20 constitutes a refrigeration cycle to circulate a refrigerant with a compressor 22, a condenser 24, a receiver 26, and an expansion valve 28.

That is, the evaporator 20 absorbs heat of the ventilation air in the air conditioner case 10 by evaporating the refrigerant. The compressor 22 draws and compresses a gas-phase refrigerant evaporated in the evaporator 20.

The condenser 24 is configured to cool the gas-phase refrigerant having high temperature and high pressure and having being compressed by the compressor 22 and the gas-phase refrigerant becomes a liquid-phase refrigerant. The receiver 26 stores the liquid-phase refrigerant generated at the condenser 24, and controls an amount of the refrigerant circulating through the refrigerant cycle.

The receiver 26 removes bubbles in the liquid-phase refrigerant to prevent the deterioration of cooling property, and conveys the complete liquid-phase refrigerant to the expansion valve 28. The expansion valve 28 adiabatically expands the liquid-phase refrigerant to cool and decompress the refrigerant, and conveys the refrigerant to the evaporator 20.

The evaporator 20 heat-exchanges between the refrigerant cooled and decompressed at the expansion valve 28 and the ventilation air conveyed to the evaporator 20 to cool the ventilation air.

The air conditioner 2 in this embodiment includes an outside air temperature sensor 32 and an inside air temperature sensor 34 that are respectively detect the temperature of the outside air and the temperature of the inside air. The outside air temperature 32 and the inside air temperature sensor 34 correspond to an intake air temperature detecting section that detects a temperature of air prior to being drawn into the air conditioner case 10 by a rotation of the blower 16. The outside air temperature 32 and the inside air temperature 34 correspond to a first temperature sensor.

The evaporator 20 includes an evaporator temperature sensor 36 to detect a temperature of the evaporator 20 (hereinafter referred as an evaporator temperature). The evaporator temperature sensor 36 corresponds to an evaporator temperature detecting section. The evaporator temperature 36 also corresponds to a second temperature sensor.

These temperature sensors 32, 34, and 36 are electrically connected to an air conditioner ECU 40. The air conditioner ECU 40 is also in electrical connection with an operational section 44 with which a user makes various settings such as a target temperature in the vehicle cabin, and a display 46 to display operation states of the air conditioner 2, and the like.

The air conditioner ECU 40 is an electronic control device to control the air conditioner 2 based on the outside air temperature, the inside air temperature, and the evaporator temperature respectively detected by the temperature sensors 32, 34, and 36, and control conditions such as the target temperature made by a user with the operational section 44.

The air conditioner ECU 40 is formed of a microcomputer including CPU (i.e., a processor), ROM, RAM, and the like. The CPU executes a predetermined control process based on programs and data stored in the ROM or a nonvolatile memory 42 shown in FIG. 1 to control the above-mentioned sections.

Specifically, the air conditioner ECU 40 executes various control processes including a switching control of the inside/outside air switching door 12, a rotation control of the blower 16, an operation control of the compressor 22, and a temperature control of the ventilation air by the air mix door 18.

The operation of the compressor 22 is controlled by turning on and off the compressor 22 based on detecting signals from the evaporator temperature sensor 36 such that the evaporator temperature falls within a predetermined temperature range between a minimum temperature T1 and a maximum temperature T2.

Figure 2A:
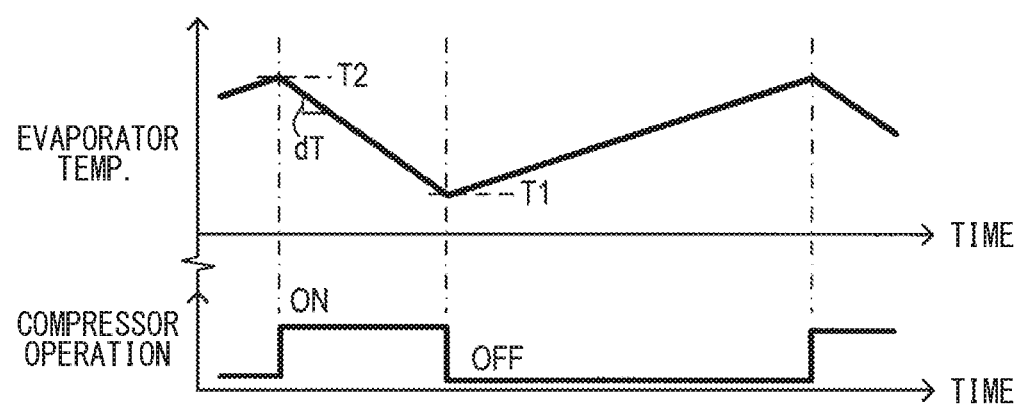
FIG. 2A is a time chart illustrating a controlling operation of a compressor by an air conditioner ECU with a normal filter.
Figure 2B:
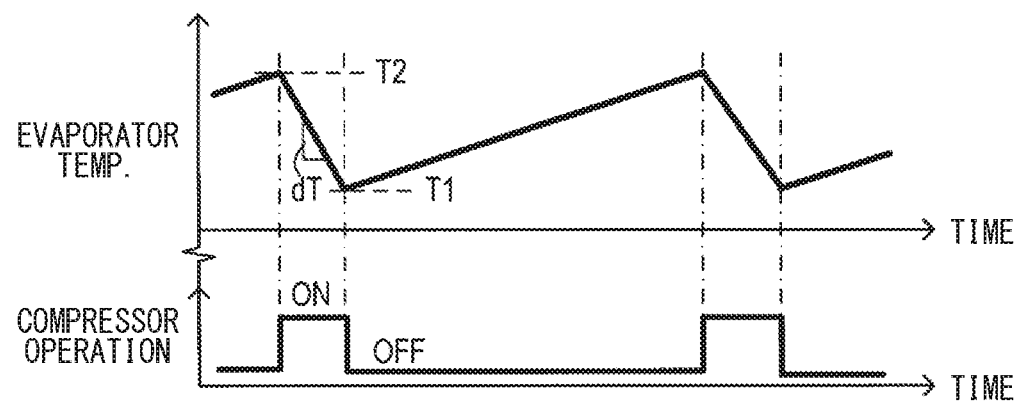
FIG. 2B is a time chart illustrating a controlling operation of a compressor by an air conditioner ECU with a clogged filter.

Specifically, as shown in FIGS. 2A, 2B, the air conditioner ECU 40 commands a drive instruction of the compressor 22 to turn on the compressor 22 when the evaporator temperature reaches the maximum temperature T2 during stopping the compressor 22, When the evaporator temperature decreases to the minimum temperature T1 by the operation of the compressor 22, the air conditioner ECU 40 withdraws the drive instruction of the compressor 22 to turn off the compressor 22.

As shown in FIGS. 2A, 2B, a change rate dT per unit time of the evaporator temperature in driving the compressor 22 is larger in a degraded filter 14 with clogged than in a normal filter 14 without degradation.

When the filter 14 is clogged up, the amount of air drawn into the air conditioner case 10 by the rotation of the blower 16 is reduced, thereby reducing an amount of heat in the intake air released to the evaporator 20. That is, when the filter 14 is clogged up, the evaporator 20 is cooled more rapidly by operating the compressor 22 than in normal.

The air conditioner ECU 40 calculates the temperature change rate dT per unit time of the evaporator 20 during operating the compressor 22, compares the temperature change rate dT with a standard temperature change rate of the filter 14 in normal, and predicts the degradation degree of the filter 14.

Figure 3:
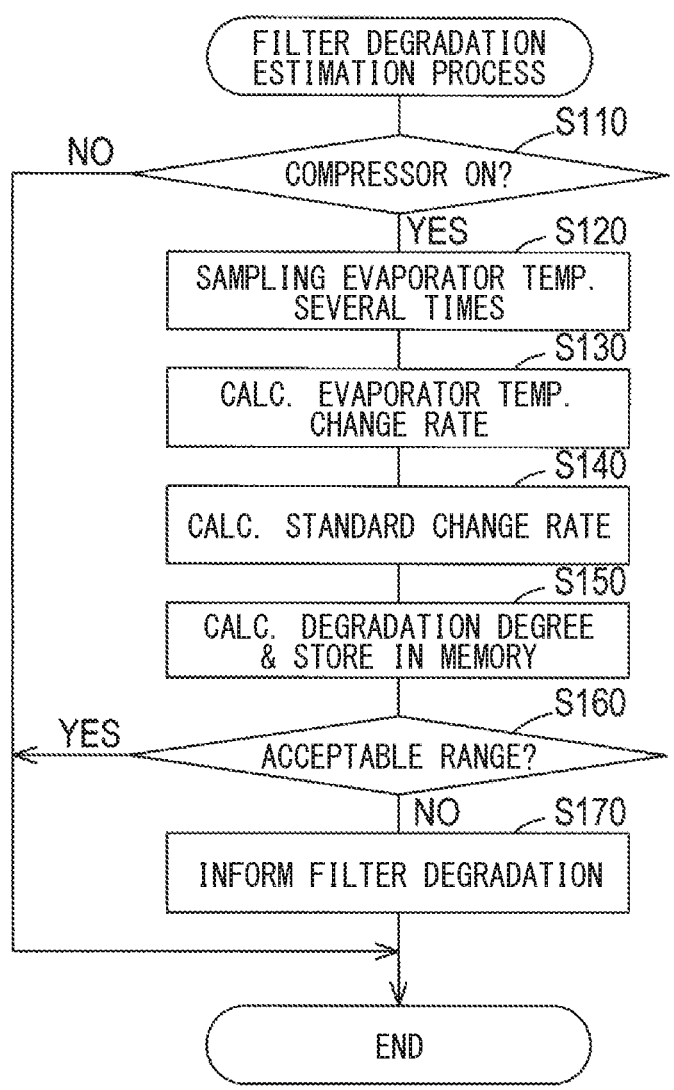
FIG. 3 is a flow chart illustrating a filter-degradation estimation process executed by the air conditioner ECU.

The CPU executes the programs stored in the ROM or the memory 42, and the air conditioner ECU 40 thereby executes the filter-degradation estimation process shown in FIG. 3 other than the above-mentioned controls.

As shown in FIG. 3, in the filter-degradation estimation process, the air conditioner ECU 40 determines whether the compressor 22 is operated by the operation control of the compressor 22 in S110. In S110, the air conditioner ECU 40 waits for driving the compressor 22.

When the compressor 22 is determined to be operated in S110, the process proceeds to S120. In S120, the evaporator temperature is sampled several times with intervals based on detecting signals of the evaporator temperature sensor 36. In following S130, a temperature change rate per unit time of the evaporator 20 (hereinafter referred as an evaporator temperature change rate or actual change-rate) is calculated based on the evaporator temperatures sampled in S120.

Next, in S140, the evaporator temperature change rate in the normal filter 14 that is not clogged up is calculated as a standard change rate (i.e., an expected change-rate) based on the temperature of the intake air, operation levels of the blower 16 and the compressor 22 such as a rotation speed of the blower 16 and the rotation speed of the compressor 22. The air conditioner ECU 40 calculates the expected change-rate per unit time of the evaporator temperature based on the air temperature and operation levels of the blower and the compressor by using predetermined data corresponding to a properly functioning filter.

The temperature of the intake air is the temperature of the outside air or the inside air prior to being selectively drawn into the air conditioner case 10 through the inside/outside air switching door 12. The temperature of the intake air is calculated based on the detecting signals of the outside air temperature sensor 32 and/or the inside air temperature sensor 34.

The rotation speed of the blower 16 is a rotation speed calculated based on the operation command value for the blower 16 that is set in the rotation control of the blower 16. The rotation speed of the compressor 22 is a rotation speed of the compressor 22 set by the operation command value for the compressor 22.

The memory 42 stores a map for calculating the standard change rate with using the rotation speed of the blower 16, the temperature of the intake air, and the rotation speed of the compressor 22 as parameters. In S140, the standard change rate is calculated with the map. The map for calculating the standard change rate is prepared in advance by experiments or simulations.

The evaporator temperature change rate and the standard change rate are calculated at S130 and S140, and a difference therebetween is calculated in S150. The difference may be calculated by subtracting the evaporator temperature change rate from the standard change rate, That is, the air conditioner ECU 40 calculates a degradation degree of the filter by comparing the actual change-rate to the expected change rate. In S150, the calculated difference is stored in the memory 42 as a degradation degree indicating a degree of clogging up in the filter 14.

Next, in S160, the air conditioner ECU 40 determines whether the degradation degree of the filter 14 calculated at S150 falls within a predetermined acceptable range. If the degradation degree of the filter 14 falls within the acceptable range, it is determined that the filter 14 is not degraded largely (i.e., the filter is not greatly clogging up) and can be used continuously. The process proceeds to S110, and the air conditioner ECU 40 waits for driving the compressor 22 for the next time.

In contrast, when the degradation degree of the filter 14 is determined to be out of the acceptable range at S160, the air conditioner ECU 40 determines that the filter 14 needs to be replaced, and the process proceeds to S170. In S170, the air conditioner ECU 40 outputs a signal indicating degradation of the filter. That is, an icon or a message to advice a user to replace the filter 14 is displayed on the display 46, and the user is thereby informed about the degradation of the filter 14. After that, the filter-degradation estimation process is finished.

Accordingly, the air conditioner 2 in this embodiment can inform the user about the degradation of the filter 14 with clogged up, and urge the user to replace the filter 14.

Figure 4:
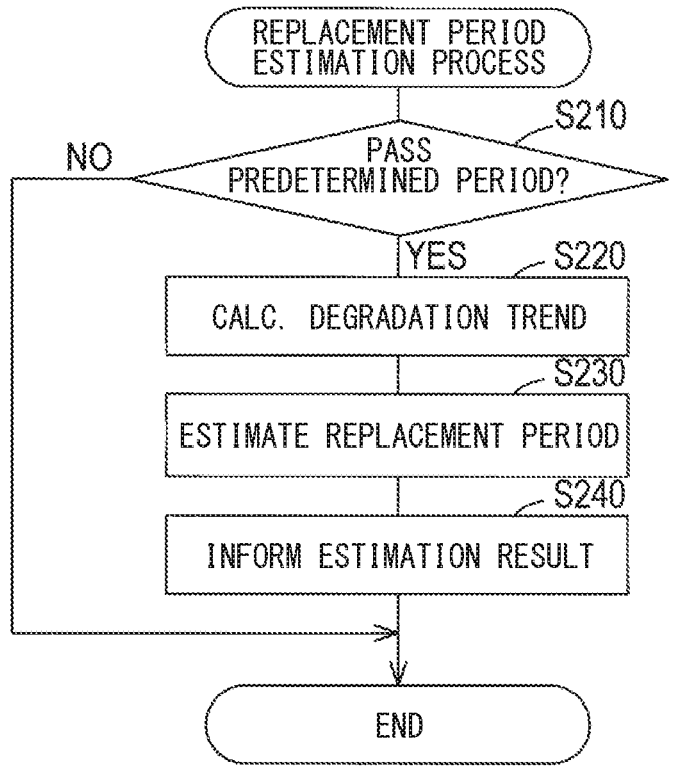
FIG. 4 is a flow chart illustrating a replacement-period estimation process executed by the air conditioner ECU.

The CPU executes programs stored in the ROM or the memory 42, and the air conditioner ECU 40 can thereby execute a replacement-period estimation process shown in FIG. 4 in addition to the filter-degradation estimation process described above.

The replacement-period estimation process is a process to estimate a replacement period of the filter 14 from past data of the degradation degree of the filter 14 memorized in the memory 42 through the filter-degradation estimation process. The replacement-period estimation process is performed every predetermined period such as a month or a few weeks.

As shown in FIG. 4, in the replacement-period estimation process, the air conditioner ECU 40 determines whether the predetermined period (e.g., a month) has passed since the replacement period was estimated for the last time in S210. If the predetermined period has not passed, the replacement-period estimation process is finished. If the predetermined period has passed, the process proceeds to S220.

Figure 5:
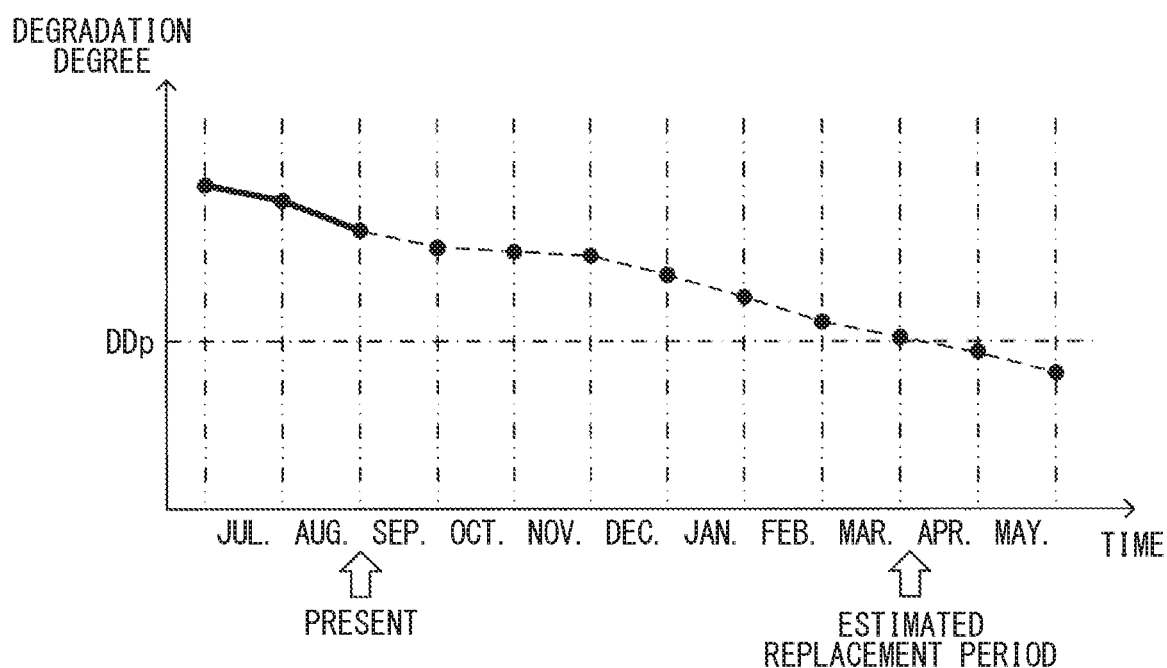
FIG. 5 is a graph for estimating a replacement period based on past data of degradation degrees of a filter.

In S220, a degradation trend of the filter 14 during the predetermined period is calculated from changes of the degradation degree of the filter 14 stored in the memory 42 during the predetermined period. As shown in FIG. 5, the degradation trend may be calculated by calculating a standard deviation during the predetermined period and then calculating a gradient of the degradation degree during the predetermined period with the standard deviation.

In S230, the replacement period of the filter 14 is predicted based on the degradation trend of the filter 14 during the predetermined period calculated at S220 and the former degradation tendencies of the filter 14 every predetermined period stored in the memory 42. That is, in S230, a change of the degradation degree of the filter 14 is estimated every predetermined period from the present based on the former degradation trends including the degradation trend calculated this time as indicated by a dashed line in FIG. 5. The time when the estimated change of the degradation degree of the filter 14 reaches a proposed replacement line DDp is calculated as the replacement estimation period.

The degradation trend of the filter 14 changes largely depending on seasons, Thus, in the step S230, the change of the degradation degree is predicted according to seasons using the degradation trend calculated in the same season last year. In S230, during a season in which the degradation trend has never calculated before, the change of the degradation degree is estimated with using an initial value for the degradation trend created by seasons.

In following S240, the replacement estimation period calculated at S230 is displayed on the display 46 as an estimation result for the replacement period of the filter 14. Thus, the air conditioner ECU 40 informs the user about the replacement period of the filter 14, and finishes the replacement-period estimation process.

The air conditioner 2 in this embodiment enables the users to know the proposed replacement period and replace the filter 14 before informed of the degradation of the filter 14 predicted by the process of S170 described above.

As described above, in the air conditioner 2 in this embodiment, the air conditioner ECU 40 controlling the air conditioner 2 functions as the filter-degradation estimating device in the present disclosure. The air conditioner ECU 40 predicts the degradation degree of the filter 14 and the replacement period of the filter 14.

The degradation degree of the filter 14 is calculated based on the change rate per unit time of the evaporator temperature during operating the compressor 22 and the standard change rate of the evaporator temperature.

The standard change rate of the evaporator temperature is calculated as the change rate of the evaporator temperature per unit time when the filter 14 is not clogging up, based on the temperature of the intake air, the rotation speed of the blower 16, and the rotation speed of the compressor 22.

The air conditioner ECU 40 can predict the degradation degree of the filter 14 accurately even if the temperature of the outside air and the inside air drawn into the air conditioning case 10 is changed.

The air conditioner ECU 40 does not need to vary the rotation speed of the blower 16 and the compressor 22 to predict the degradation degree of the filter 14. Thus, the air conditioner ECU 40 can predict the degradation degree of the filter 14 without affecting the air conditioning control by the air conditioner ECU 40.

In this embodiment, the degradation degrees calculated when the compressor 22 is operated is successively stored in the memory 42, and with the past data of the degradation degree stored in the memory 42, the degradation trend of the filter 14 is calculated with predetermined intervals. In addition, the past data of the degradation trend are used to estimate the replacement period of the filter 14.

Thus, even if the degradation trend of the filter 14 varies depending on seasons and operating environments, the replacement period of the filter 14 can be estimated according to the change of the degradation trend. Thus, the users can be informed about the replacement period of the filter 14 more accurately.

In this embodiment, the air conditioner ECU 40 corresponds to a temperature change rate calculating section, a standard change rate calculating section, a degradation degree calculating section, and a replacement period estimating section.

The functions as the temperature change rate calculating section are achieved by the process in S100 to S130 performed in the filter-degradation estimation process shown in FIG. 3. The functions as the standard change rate calculating section are achieved by the process in S140 performed in the filter-degradation estimation process. The functions as the filter degradation estimating section are achieved by the process in S150 performed in the filter-degradation estimation process. The functions as the replacement period estimating section are achieved in the replacement-period estimation process shown in FIG. 4.

The embodiments in the present disclosure are described, but the present disclosure is not limited to the above-mentioned embodiments. The embodiments can be modified appropriately.

In the filter-degradation estimation process, the filter-degradation estimating device in the above-mentioned embodiment determines whether the filter 14 needs to be replaced based on the degradation degree of the filter 14, and informs the user about the requirement of the replacement.

However, in the filter-degradation estimation process, the calculated degradation degree of the filter 14 may be displayed on the display 46. The user can be aware of the degradation degree of the filter 14 displayed on the display 46, and expect the replacement period of the filter 14 in advance.

In the above-mentioned embodiments, the functions as the temperature change rate calculating section, the standard change rate calculating section, the degradation degree calculating section, and the replacement period estimating section in the present disclosure are performed by the air conditioner ECU 40 in the filter-degradation estimation process and the replacement-period estimation process.

However, these functions may be performed by a computer that is not the air conditioner ECU 40, or a part and all of these functions may be performed by hardware circuits.

Multiple functions of an element in the embodiments may be achieved by multiple elements, or one function of an element may be achieved by multiple elements. In addition, multiple functions of the multiple elements may be achieved by an element, or one function of the multiple elements may be achieved by an element. A part of the above-mentioned embodiment may be omitted.

The present disclosure can be achieved in various embodiments such as a program to functionalize a computer as a filter-degradation estimating device, a non-transitory recording medium such as a semiconductor memory memorizing the program, and a filter-degradation estimating method.

What is claimed is:

1. A filter-degradation estimating device for a vehicular air conditioner for estimating a degradation degree of a filter for cleaning air drawn into an air conditioner case by a blower in the vehicular air conditioner, the filter degradation estimating device comprising:
   an intake air temperature detecting section configured to detect a temperature of the air prior to being drawn into the air conditioner case through the filter and the blower;
   an evaporator temperature detecting section configured to detect a temperature of an evaporator disposed in the air conditioner case, the evaporator being configured to cool the air drawn into the air conditioner case through evaporation of a refrigerant;
   a temperature change-rate calculating section configured to calculate a change rate per unit time of the temperature of the evaporator detected by the evaporator temperature detecting section when a compressor is operated, the compressor being configured to intake and compress the refrigerant evaporated at the evaporator;
   a standard change-rate calculating section configured to calculate a standard change-rate based on the temperature of the air detected by the intake air temperature detecting section and operation command values for the blower and the compressor in the air conditioner, the standard change-rate being a change rate per unit time of the temperature of the evaporator when the filter is not degraded; and
   a degradation degree calculating section configured to calculate a degradation degree of the filter based on the temperature change-rate calculated by the temperature change-rate calculating section and the standard change-rate calculated by the standard change rate calculating section.

2. The filter-degradation estimating device for a vehicular air conditioner according to claim 1, the filter-degradation estimating device further comprising
   a replacement period estimating section configured to estimate a replacement period of the filter based on past data of the degradation degree calculated by the degradation degree calculating section.

3. The filter-degradation estimating device for a vehicular air conditioner according to claim 2, wherein
   the replacement period estimating section is configured to
      calculate a change trend of the degradation degree, a predetermined intervals based on the past data of the degradation degree calculated by the degradation degree calculating section, and
      calculate the replacement period based on the change trend.

4. A filter monitoring system for a filter in a vehicle air conditioner including an air conditioner case, a blower, an evaporator, and a compressor, the filter monitoring system comprising:
   a first temperature sensor configured to detect an air temperature of intake air prior to being drawn by the blower into the air conditioner case through the filter;
   a second temperature sensor configured to detect an evaporator temperature of the evaporator in the air conditioner case; and
   one or more processors coupled to the first and second temperature sensors and coupled to a memory storing program instructions that when executed by the one or more processors cause the one or more processors to at least:
      calculate an actual change-rate per unit time of the evaporator temperature while the compressor is in operation,
      calculate an expected change-rate per unit time of the evaporator temperature based on the air temperature and operation levels of the blower and the compressor by using predetermined data corresponding to a properly functioning filter, calculate a degradation degree of the filter by comparing the actual change-rate to the expected change-rate, and output a signal indicating degradation of the filter upon determining that the degradation degree is out of a predetermined acceptable range.

5. The filter monitoring system according to claim 4, wherein the memory has stored thereon past data of the degradation degree calculated by the one or more processors, and the program instructions further cause the one or more processors to estimate a replacement period of the filter based on the past data.

6. The filter monitoring system according to claim 5, wherein the program instructions further cause the one or more processors to:

calculate a change trend of the degradation degree, a predetermined intervals based on the past data; and calculate the replacement period based on the change trend.

7. An air conditioner for a vehicle, comprising:

an air conditioner case;

a blower configured to draw an intake air into the air conditioner case;

a filter for cleaning the intake air drawn by the blower;

an evaporator configured to cool the intake air in the air conditioner case through evaporation of a refrigerant;

a compressor configured to intake and compress the refrigerant evaporated at the evaporator;

a first temperature sensor configured to detect an air temperature of the intake air prior to being drawn by the blower into the air conditioner case through the filter;

a second temperature sensor configured to detect an evaporator temperature of the evaporator; and one or more processors coupled to the first and second temperature sensors and coupled to a memory storing program instructions that when executed by the one or more processors cause the one or more processors to at least:

drive the evaporator and the compressor at respective operation levels, calculate an actual change-rate per unit time of the evaporator temperature while driving the compressor, calculate an expected change-rate per unit time of the evaporator temperature based on the air temperature and the operation levels of the blower and the compressor by using predetermined data corresponding to a properly functioning filter, calculate a degradation degree of the filter by comparing the actual change-rate to the expected change-rate, and output a signal indicating degradation of the filter upon determining that the degradation degree is out of a predetermined acceptable range.

8. The air conditioner for a vehicle according to claim 7, wherein the memory has stored thereon past data of the degradation degree calculated by the one or more processors, and the program instructions further cause the one or more processors to estimate a replacement period of the filter based on the past data.

9. The air conditioner for a vehicle according to claim 8, wherein the program instructions further cause the one or more processors to:

calculate a change trend of the degradation degree, a predetermined intervals based on the past data; and calculate the replacement period based on the change trend.

* * * * *